March 18, 1924.  1,487,391

R. KÖCHLIN

HYDRAULIC POWER PLANT

Filed March 31, 1921

Inventor:
René Köchlin
by Henry Orth

Patented Mar. 18, 1924.

1,487,391

UNITED STATES PATENT OFFICE.

RENÉ KÖCHLIN, OF BASEL, SWITZERLAND, ASSIGNOR OF ONE-HALF TO THE FIRM OF LOCHER & COMPANY, OF ZURICH, SWITZERLAND.

HYDRAULIC POWER PLANT.

Application filed March 31, 1921. Serial No. 457,448.

(GRANTED UNDER THE PROVISIONS OF THE ACT OF MARCH 3, 1921, 41 STAT. L., 1313.)

*To all whom it may concern:*

Be it known that I, RENÉ KÖCHLIN, a citizen of the Republic of Switzerland, residing at Basel, Switzerland, have invented certain new and useful Improvements in Hydraulic Power Plants (for which I have filed applications in Switzerland March 20, 1915, Patent No. 70,190; Austria, March 18, 1916, Patent No. 74,528; Germany, Sept. 6, 1919, Patent No. 304,457; Italy, October 9, 1916, application No. 26/22, and France, March 5, 1917, Patent No. 483,107); and I do hereby declare the following to be a full, clear, and exact description of the invention, such as will enable others skilled in the art to which it appertains to make and use the same, reference being had to the accompanying drawing, and to figures marked thereon, which form a part of this specification.

For the purpose of catching, in hydraulic power plants, floating material it has already been proposed to provide rakes, which project beyond the upper-water level. This has, however, the drawback, that ice or other material, such as leaves, branches and the like, floating on the water level are collected in front of the rake, thus preventing in part the water from passing through said rake.

It is now the aim of the present invention to eliminate this drawback and to this end I provide an arrangement for diverting ice and floating material in water power plants, which comprises a rake arranged wholly beneath the upper-water level and a chamber arranged above the rake, which, instead of being connected in the usual manner to the lower-water canal by means of a conduit leading through the hydraulic motor, is connected to said lower-water canal by means of a by-pass conduit, so that ice or floating material collecting in said chamber provided above the rake are directly discharged through said by-pass conduit into the lower-water canal.

The by-pass conduit, the bottom of which may form for instance the continuation of the upper end of the rake, may be arranged above the hydraulic motor.

I find it also advisable to provide means for interrupting the connection between said chamber and by-pass conduit, these means consisting preferably of a sluice adapted to be moved in a vertical direction.

This invention will now be more particularly described with reference to the accompanying drawing, which illustrates a constructional example of the invention.

Figure 1:
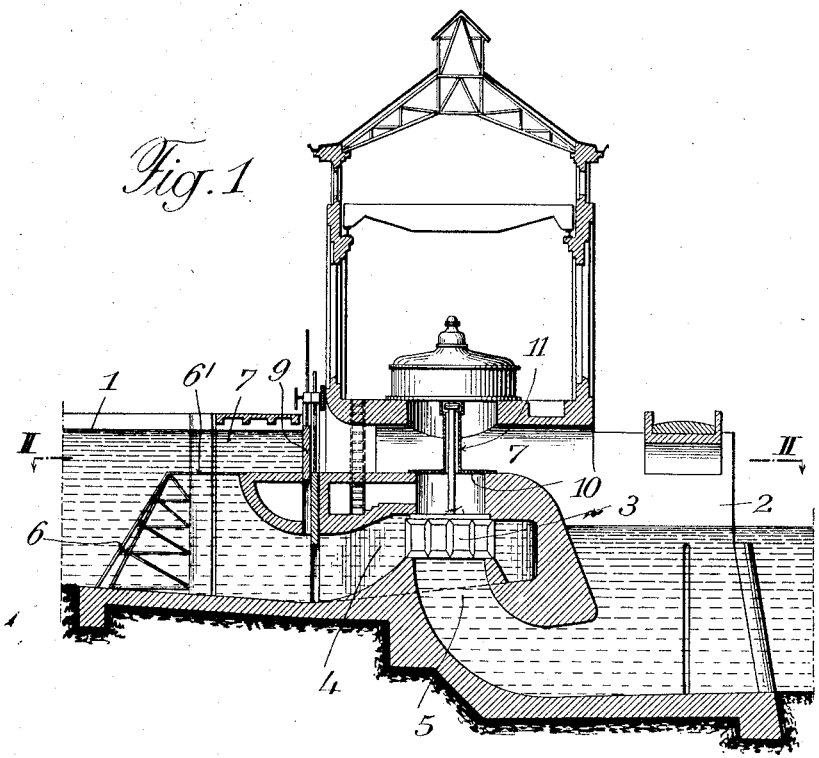
Fig. 1 is a vertical cross-section through a hydraulic power plant.
Figure 2:
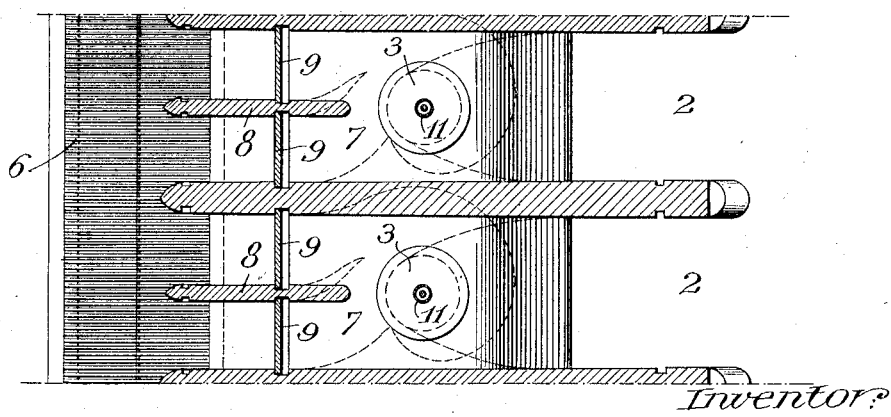
Fig. 2 is a section on the line II—II of Fig. 1.

In the embodiment of the invention illustrated, 1 denotes the upper-water canal, 2 denotes the lower-water canal and 3 are the turbines disposed between these canals. A conduit 4 leads from the upper-water canal 2 to each turbine 3 whilst a conduit 5 connects each turbine 3 to the lower-water canal 2. 6 denotes a rake arranged in the upper-water canal 1 in front of the conduits 4. The upper part 6' of the rake 6 is horizontal and this part 6' is arranged on the same level as the bottom of the conduits 7. The end of these conduits 7, which communicates with the upper-water canal 1, is divided into two branches by means of a partition wall 8. Each of these branches can be closed by means of a sluice 9 and each of them leads above the conduits 4, 5 directly to the lower-water canal 2. At the place, where each of these conduits 7 crosses the shaft, at the lower end of which is arranged a turbine 3, I provide a cover 10 and a sleeve 11 forming a partition between these conduits 7 and the turbines and their spindles, respectively.

The sluices 9 are normally in the position shown in Fig. 1, so that the water in the upper-water canal 1 is prevented from flowing through the conduits 7. The rake 6, 6' is also wholly beneath the upper-water level, so that ice or other material floating on the water level do not come in contact with this rake as this material collects in the front part of the conduits, 7, which part forms a chamber. When a sufficiently large amount of such material has been collected in said chambers, the sluices 9 are lowered, so that these impurities are discharged into the lower-water canal 2 through the conduits 7, whereupon the sluices 9 are again raised, so that the conduits 7 are again closed.

In case that more water flows into the upper-water canal 1 than passes through the turbine 3 into the lower-water canal 2, the sluices 9 may be lowered to such an amount that the superfluous water flows over said sluices, so that floating material, that is ice, leaves and the like, are continuously discharged through said conduits 7 into the lower-water canal 2.

It will be seen, that in the hereinbefore described power plant the rake 6, 6' is much less blocked up with impurities than it has been hitherto the case, as the impurities floating on the water level and effecting in particular such a blocking up of the rake do not come at all in contact with it.

What I claim is:

1. A water power plant comprising an upper water canal, a lower water canal, a conduit connecting said two canals, a turbine of the vertical type inserted in said conduit, the lower portion of the upper water canal joining to said conduit and the upper portion of the upper water canal joining to a separate channel situated substantially above said conduit and leading to the lower water canal and adapted to discharge floating material directly into the lower-water canal, a rake extending over the whole cross-sectional area of the lower portion of the upper water canal, and a gate arranged in said separate channel and adapted to regulate the flow of water through the upper portion of the upper water canal.

2. A water power plant, comprising an upper water canal, a lower water canal, a conduit connecting said two canals, a turbine of the vertical type inserted in said conduit, the lower portion of the upper water canal joining to said conduit and the upper portion of the upper water canal joining to a separate channel situated substantially above said conduit and leading to the lower water canal, and adapted to discharge floating material directly into the lower-water canal, a rake having an inclined portion extending over the whole cross-sectional area of the lower portion of the upper water canal and a horizontal portion that is flush with the floor of said separate channel, and a gate arranged in said separate channel and adapted to regulate the flow of water through the upper portion of the upper water canal.

3. A water power plant comprising an upper water canal, a lower water canal, a conduit connecting said canals, a rake for said conduit, a turbine inserted in said conduit, a normally closed branch conduit connecting said canals and passing over the turbine, a sluice gate controlling said branch conduit whereby said branch conduit may be opened at will.

4. A water power plant comprising an upper canal, a lower canal, a main conduit connecting the canals, a turbine inserted in said conduit, a normally closed branch conduit connecting said canals and passing above said turbine, a sluice gate for controlling said branch canal, a rake over the entrance of said main conduit, said rake terminating at the bottom of said branch conduit.

5. A water power plant comprising an upper canal, a lower canal, a main conduit connecting the canals, a turbine in said conduit, a branch conduit passing over the top of said turbine, a sluice gate normally closing said branch conduit, an inclined rake extending the whole width of the upper canal, covering the main conduit opening and having a horizontal portion submerged to the depth of water normally in said branch conduit.

In testimony that I claim the foregoing as my invention, I have signed my name in presence of two subscribing witnesses.

RENÉ KÖCHLIN.

Witnesses:
CARL O. SPAMER,
LYDIA UEBELE.